(12) United States Patent
Hotter

(10) Patent No.: US 12,527,261 B1
(45) Date of Patent: Jan. 20, 2026

(54) HAY-BALE-CONTAINMENT SYSTEM AND METHODS OF USE

(71) Applicant: AD Ventures LLC, Bayfield, CO (US)

(72) Inventor: Dalton F. Hotter, Bayfield, CO (US)

(73) Assignee: AD Ventures LLC, Bayfield, CO (US)

( * ) Notice: Subject to any disclaimer, the term of this patent is extended or adjusted under 35 U.S.C. 154(b) by 0 days.

(21) Appl. No.: 19/065,626

(22) Filed: Feb. 27, 2025

(51) Int. Cl.
  *A01K 1/10* (2006.01)
  *A01F 25/12* (2006.01)

(52) U.S. Cl.
  CPC ............... *A01F 25/12* (2013.01); *A01K 1/10* (2013.01)

(58) Field of Classification Search
  CPC . A01K 1/10; A01K 1/105; A01K 5/00; A47C 17/04; A47C 17/16; A47C 17/22; A47C 17/24; A47C 17/26; A47C 17/48; A47C 19/12; A47C 19/122
  See application file for complete search history.

(56) References Cited

U.S. PATENT DOCUMENTS

| | | | | |
|---|---|---|---|---|
| 3,077,612 | A * | 2/1963 | Sevcik | A47C 17/48 5/618 |
| 8,794,699 | B1 * | 8/2014 | Rudolfo | A47C 4/20 297/118 |
| 2015/0313174 | A1 * | 11/2015 | Gibbons | A01K 1/10 119/60 |
| 2019/0223609 | A1 * | 7/2019 | Sherman | A47C 27/14 |
| 2024/0107978 | A1 * | 4/2024 | Moran | A01K 1/10 |

FOREIGN PATENT DOCUMENTS

| | | | | |
|---|---|---|---|---|
| FR | 3097099 | * | 12/2020 | |
| FR | 3097099 A1 | * | 12/2020 | ........... A01K 5/0107 |
| KR | 20110024757 | * | 3/2011 | |
| KR | 20110024757 A | * | 3/2011 | ............. A01K 1/105 |
| KR | 20110047335 | * | 5/2011 | |
| KR | 20110047335 A | * | 5/2011 | ............... A01K 5/02 |
| KR | 20110009450 U | * | 10/2011 | ............. A01K 1/105 |
| KR | 20110009451 | * | 10/2011 | |
| KR | 20110009451 U | * | 10/2011 | ............. A01K 1/105 |
| WO | WO-2005072511 A1 | * | 8/2005 | ........... A01F 15/071 |

* cited by examiner

Primary Examiner — Peter M Poon
Assistant Examiner — Danielle A Clerkley
(74) Attorney, Agent, or Firm — Terrence M. Wyles, Esq.; Startup IP Law, LLC

(57) ABSTRACT

What is disclosed pertains to an improved hay-bale-containment device to be used to store discrete bales of hay, alfalfa, or other grasses/grains to be used for livestock. The device consists of a corrosion-resistant frame with a bottom "bed" that with legs to elevate any bale of livestock feed stored thereon above the ground and to allow exposure of the bottom of the bale to fresh air to keep the bale dry and fresh. The general framing design of the device is designed to help secure bales disposed therein, and is also equipped with a means to fold-up the entire device for stowage/transport.

14 Claims, 4 Drawing Sheets

HAY-BALE-CONTAINMENT SYSTEM AND METHODS OF USE

BACKGROUND

This invention relates to an improved c to be used to store discrete bales of hay, alfalfa, or other grasses/grains used to feed livestock.

Farmers, ranchers, and others in the livestock industry need to regularly put-out store bales of hay, alfalfa, and/or other grains/grasses to later access (that is, "flake-off" a piece of the bale) for various uses, including feeding their livestock (e.g., cattle, horses, etc.) to access. Current bale-containment practices used in the industry include simply placing bales directly on the ground or a concrete slab, or placing them on simple pallets laid on the ground. Unfortunately, current devices/systems (such as a simple pallet) do not effectively contain the remainder of the bale such that as parts are "flaked-off," the remaining bale is left to fall-off and spread from its pallet or location; that is, such devices cannot prevent or mitigate the degradation of/spread of the baled matter on the surrounding ground. In addition, such pallets are not designed to allow the bottom of the bale placed thereon to "breath" at its bottom and keep the feed off of the ground in order to minimize damage from moisture as well as to provide good airflow to help keep the feed dry and fresh.

What is needed is an improved hay-bale-containment device to address the above-discussed issues that is easy to transport and deploy.

BRIEF SUMMARY

The inventive disclosures contained herein pertain to an improved hay-bale-containment device to be used to store discrete bales of hay, alfalfa, or other grasses/grains to be used for livestock. In a basic embodiment, the improved hay-bale-containment device (hereinafter referred to as a "Bale Bunk™") consists of a corrosion-resistant frame with a bottom "bed" that with legs to elevate any bale of hay, alafala, or grasses/grains stored thereon above the ground and to allow exposure of the bottom of the bale to fresh air to keep the bale dry and fresh. On one end of the bed is a "back-stop" frame for the bale, whereby the back-stop is substantially disposed orthogonally with respect to the bed. In typical embodiments, the bed has a plurality of side-mounted/disposed stanchions to aid in containing a bale stored on the bed. In variations, the Bale Bunk's bed is articulated toward the opposite end of the back-stop whereby the articulated section is angled-up slightly with respect to the main part of the bed to help contain the stored bale. In still more variations, the angle of the articulated bed section is adjustable via one or more hinges as well as by length-adjustable legs disposed on the end of the articulated bed section away from the hinge(s). In even more embodiments, the Bale Bunk can be folded into itself by way of hinges and/or roll-pins on various components to allow for easier transport and stowage of the Bale Bunk.

The foregoing Brief Summary is intended to merely provide a short, general overview of the inventive disclosure described throughout this patent application, and therefore, is not intended to limit the scope of the inventive disclosure contained throughout the balance of this patent application, including any appended claims and drawings.

DETAILED DESCRIPTION

I. Overview

Figure 1:
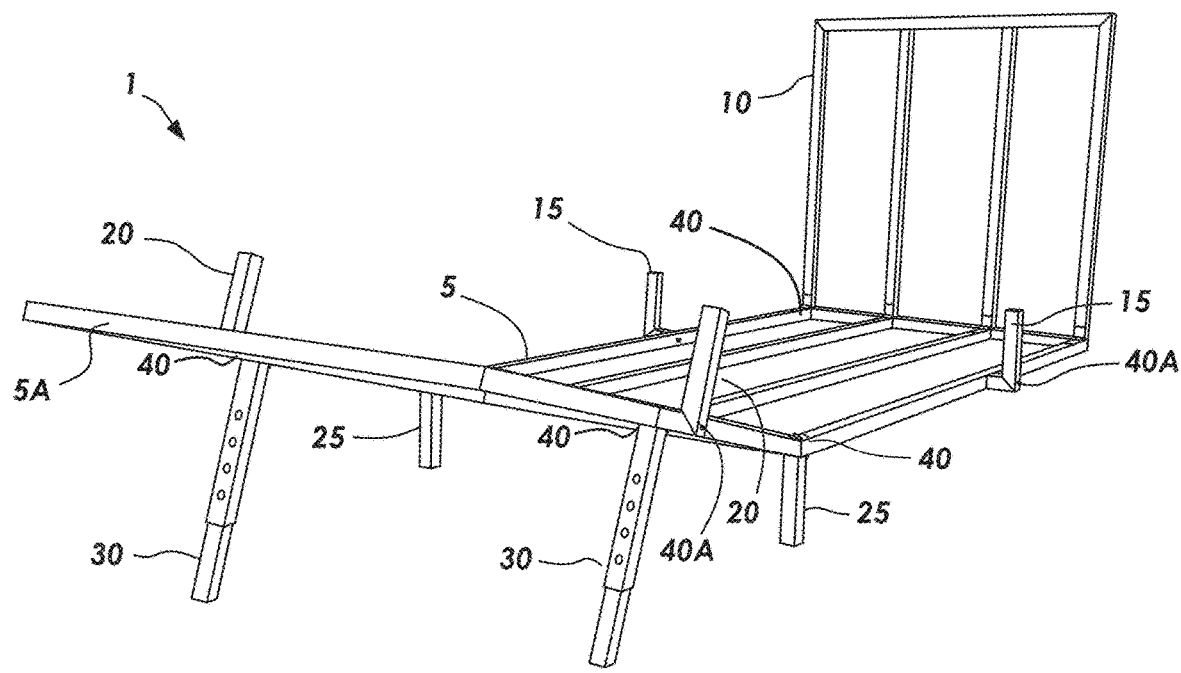
FIG. 1 depicts one embodiment of a left-distal-end perspective view of an improved hay-bale-containment device ("Bale Bunk"), featuring an articulated and adjustable bed member.

The inventive disclosures contained herein pertain to an improved hay-bale-containment device to be used to store discrete bales of hay, alfalfa, or other grasses/grains to be used for livestock. In a basic embodiment, the improved hay-bale-containment device (hereinafter referred to as a "Bale Bunk™") consists of a corrosion-resistant frame with a bottom "bed" that with legs to elevate any bale of hay, alafala, or grasses/grains stored thereon above the ground and to allow exposure of the bottom of the bale to fresh air to keep the bale dry and fresh. On one end of the bed is a "back-stop" frame for the bale, whereby the back-stop is substantially disposed orthogonally with respect to the bed. In typical embodiments, the bed has a plurality of side-mounted/disposed stanchions to aid in containing a bale stored on the bed. In variations, the Bale Bunk's bed is articulated toward the opposite end of the back-stop whereby the articulated section is angled-up slightly with respect to the main part of the bed to help contain the stored bale. In still more variations, the angle of the articulated bed section is adjustable via one or more hinges as well as by length-adjustable legs disposed on the end of the articulated bed section away from the hinge(s). In even more embodiments, the Bale Bunk can be folded into itself by way of hinges and/or roll-pins on various components to allow for easier transport and stowage of the Bale Bunk.

II. Terminology

The terms and phrases as indicated in quotes (" ") in this Section are intended to have the meaning ascribed to them in this Terminology Section applied to them throughout this document, including the claims, unless clearly indicated otherwise in context. Further, as applicable, the stated definitions are to apply, regardless of the word or phrase's case, to the singular and plural variations of the defined word or phrase.

The term "or", as used in this specification, drawings, and any appended claims, is not meant to be exclusive; rather, the term is inclusive, meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of the phrase "in one embodiment" and/or "in one variation" and similar phrases in various places in the specification are not necessarily all meant to refer to the same embodiment.

The term "couple" or "coupled", as used in this specification, drawings, and any appended claims, refers to either an indirect or a direct connection between the identified elements, components, or objects. Often, the manner of the coupling is related specifically to the manner in which the two coupled elements interact.

The term "removable", "removably coupled", "readily removable", "readily detachable", "detachably coupled", and similar terms, as used in this specification, drawings, and any appended claims, refer to structures that can be uncoupled from an adjoining structure with relative ease (i.e., non-destructively and without a complicated or time-consuming process) and that can also be readily reattached or coupled to the previously adjoining structure.

Directional and/or relational terms such as, but not limited to, left, right, nadir, apex, top, bottom, vertical, horizontal, back, front, lateral, proximal, and distal are relative to each other, are dependent on the specific orientation of an applicable element or article, are used accordingly to aid in the description of the various embodiments, and are not necessarily intended to be construed as limiting in this specification, drawings, and any appended claims.

As applicable, the terms "about", "approximately", or "generally", as used herein unless otherwise indicated, means a margin of +−20%. Also, as applicable, the term "substantially" as used herein unless otherwise indicated means a margin of +−10%. It is to be appreciated that not all uses of the above terms are quantifiable such that the referenced ranges can be applied.

The terms "hay" or "bale," unless otherwise specified, are each intended to serve as a generic term for livestock feed such as hay, alfalfa, and/or other grasses/grains in a processed bundle form/bulk. That is, neither the use of the term "hay" nor of "bale" in isolation is intended to limit the scope of any patent claims herein in any way.

The term "flake" or "flake-off" refers to the action of peeling-off sections or chunks of hay off of a bale.

III. An Improved Hay-Bale-Containment Device

Figure 2:
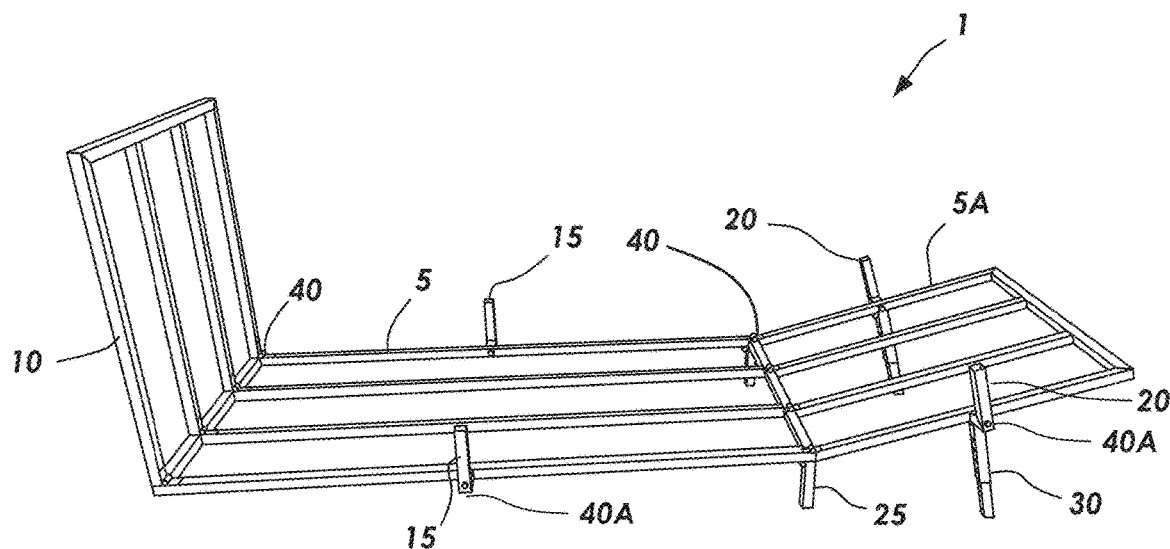
FIG. 2 depicts one embodiment of one embodiment of the right-side perspective view of the improved hay-bale-containment device ("Bale Bunk") depicted in FIG. 1.
Figure 3:
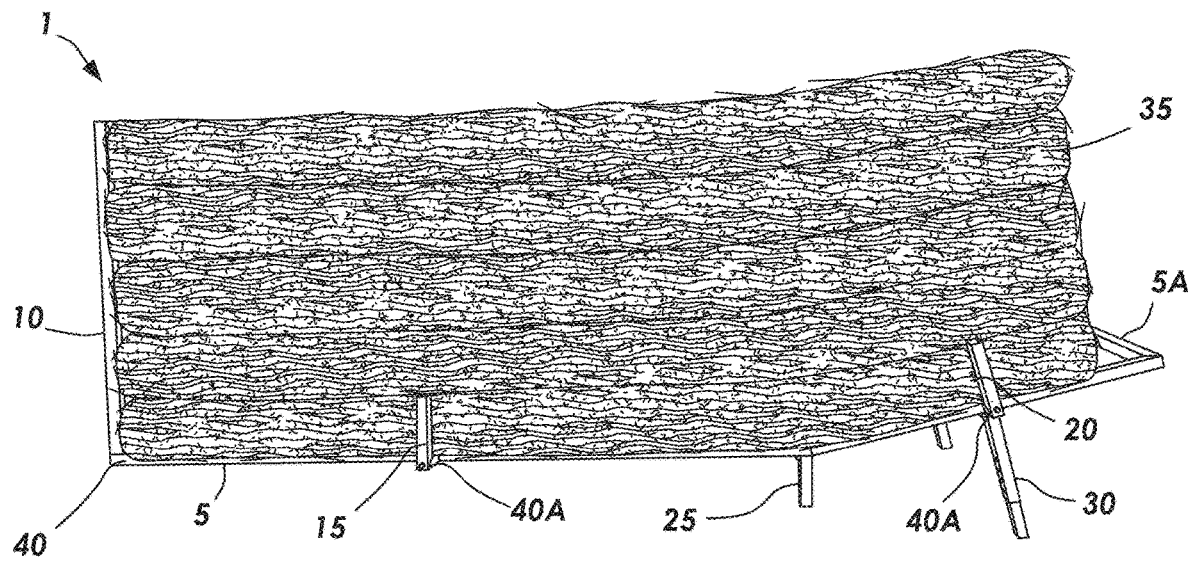
FIG. 3 depicts one embodiment of one embodiment of the left-side perspective view of the improved hay-bale-containment device ("Bale Bunk") depicted in FIG. 1, while containing a bale of hay.
Figure 4:
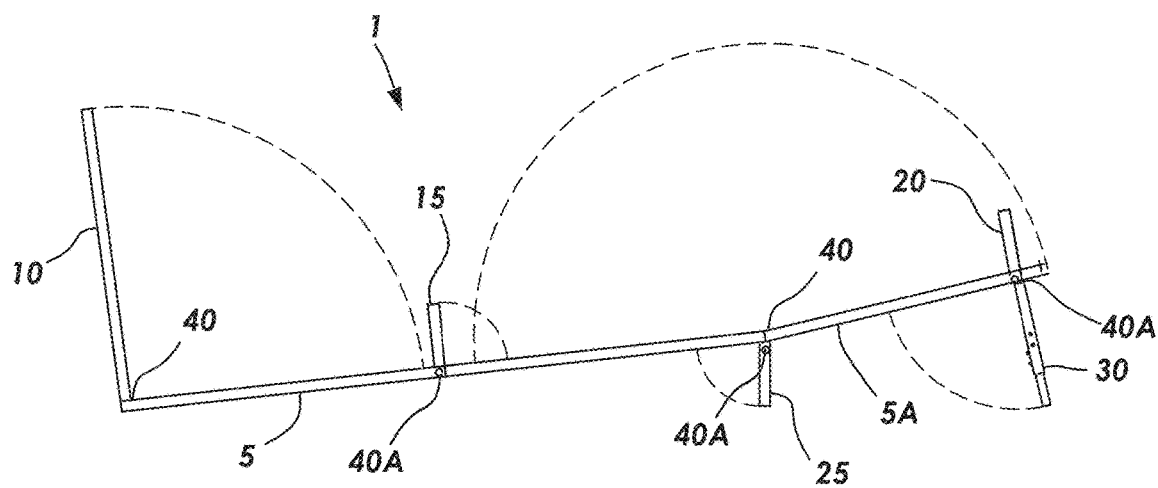
FIG. 4 depicts one embodiment of one embodiment of the right-side view of the improved hay-bale-containment device ("Bale Bunk") depicted in FIG. 1.
Figure 5:
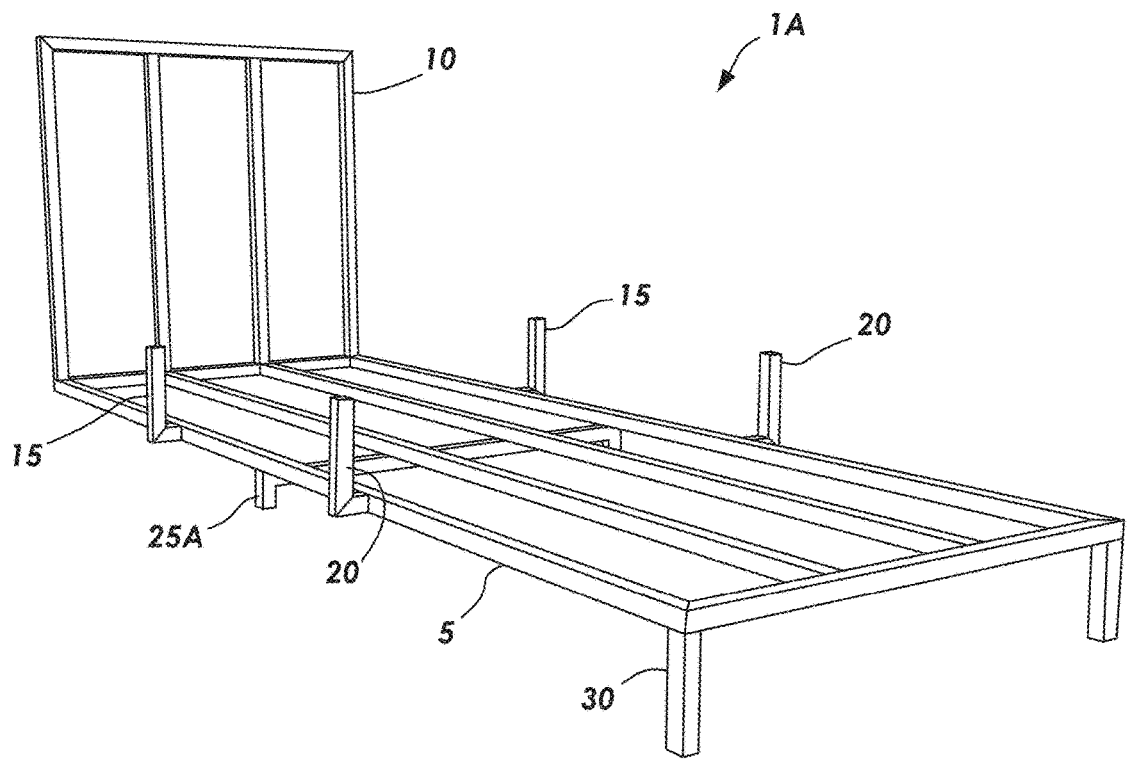
FIG. 5 depicts one alternative embodiment of a right-distal-side perspective view of an improved hay-bale-containment device ("Bale Bunk"), featuring a non-articulated bed member.
Figure 6:
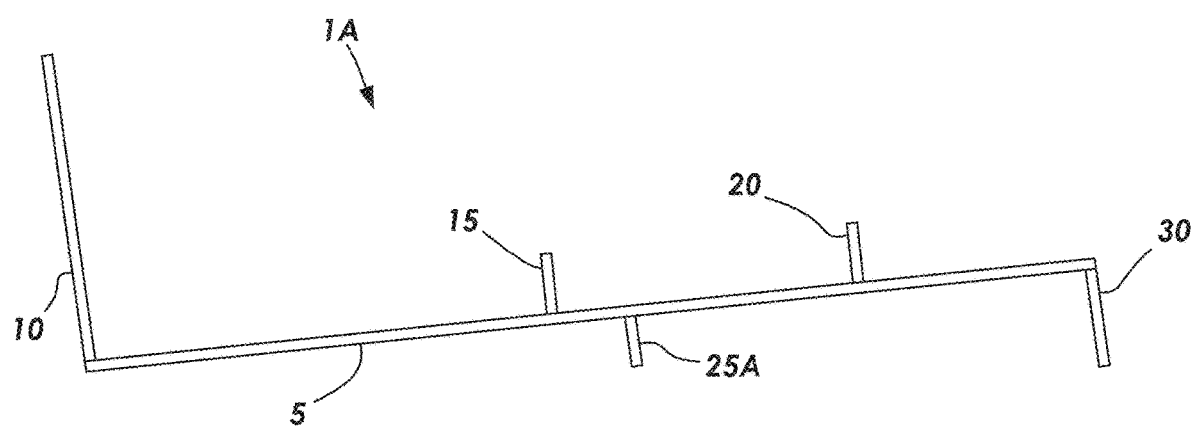
FIG. 6 depict one alternative embodiment of the right-side view of an improved hay-bale-containment device ("Bale Bunk"), featuring a non-articulated bed member.
Figure 7:
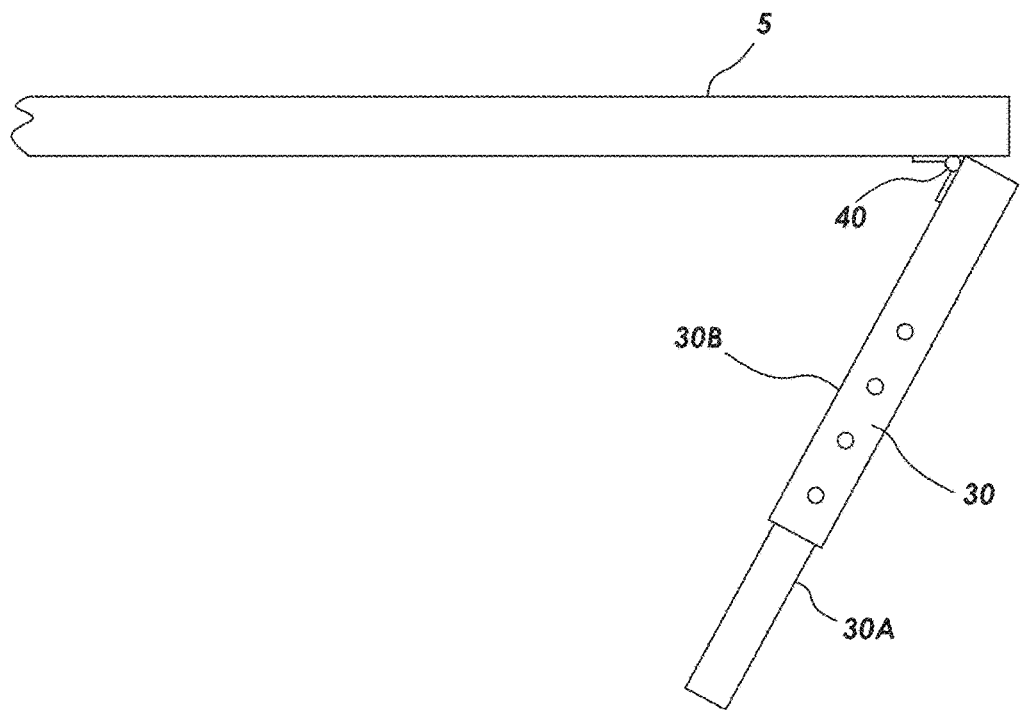
FIG. 7 depicts a close-up view of one embodiment of a hinged, telescoping, adjustable-length leg member the improved hay-bale-containment device ("Bale Bunk") depicted in FIG. 1.
Figure 8:
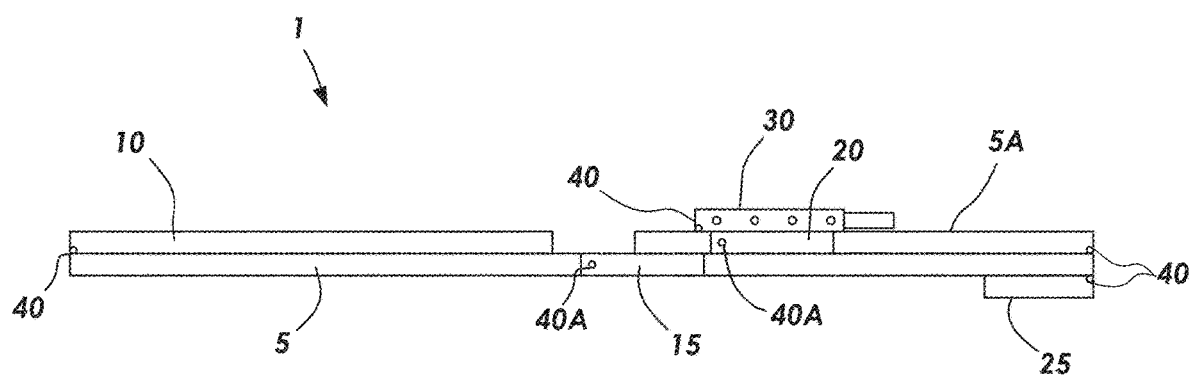
FIG. 8 depicts a right-side view of one embodiment of the improved hay-bale-containment device ("Bale Bunk") depicted in FIG. 1, but with all of the articulated members and legs folded-up for transport and/or stowage.

This Section III is directed generally to an improved hay-bale-containment device (hereinafter referred to as a "Bale Bunk"). Refer to FIGS. 1 through 8.

In a typical embodiment, the improved hay-bale-containment device ("Bale Bunk") 1, 1A comprises a sturdy framework consisting of a main bed 5 frame with a proximal end and a distal end, whereby the proximal end has a "back stop" frame member 10 that is substantially orthogonally disposed relative to the main bed 5.

In variations, Bale Bunk's 1 main bed 5 has an articulated extension 5A that is angled slightly upward with respect to the main bed 5 to aid in keeping the stored bale on the main bed 5, against the back-stop frame member 10. The angle between the articulated extension 5A and the main bed 5 plane is typically 10 degrees±5 degrees. Moreover, the main bed 5 and, if so equipped, its articulated extension 5A, have a plurality of legs 25, 25A, 30 of different lengths such that the main bed 5 is tilted slightly upward from its back-stop member 10 to the distal end of the main bed 5, which allows gravity to aid in retaining the remaining parts of a bale 35 on the main bed 5 against the back-stop frame member 10, as bale material is flaked-off by a user. This angle for facilitating bale storage is typically 10 degrees±5 degrees.

In many preferred embodiments, the articulated bed extension 5A is attached to the main bed 5 via one or more hinge members 40 to facilitate the adjustment of the angle disposed between the main bed 5 and the articulated bed extension 5A, as well as to facilitate the folding of the articulated bed extension 5A onto the main bed 5 for stowage/transport Similarly, in such embodiments, the back-stop frame member 10 is also attached to the main bed 5 via one or more hinges to facilitate the folding onto the main bed 5. In addition, the hinged back-stop frame member 10 is equipped with a rotational-travel stop to ensure that the position of the back-stop frame member 10 is substantially orthogonal with respect to the main bed 5 when unfolded for use.in the field. In variations of those embodiments, the distal-end legs 30 have adjustable lengths via telescopically disposed inner and outer members 30A, 30B with a length-adjustment locking mechanism (such as, e.g., spring-biased buttons or inserted pins or other fasteners to lock-in a desired length via pre-disposed holes in the outer telescoping member 30B. The length adjustment of the distal-end legs 30 can adjust the angle of the articulated extension 5B relative to the main bed 5.

Further providing stability to any stored bales are a plurality of stanchions 15, 20 that are side-mounted/disposed and extending upward on each side of the main bed 5 (and/or in variations, the main bed's 5 articulated extension 5A, which is discussed further below). Moreover, to further facilitate the folding of the Bale Bunk 1 for stowage/transport variations, the various legs 25, 25A, 30 and stanchions 15, 20 are equipped with hinges 40 or role pins 40A to facilitate the complete folding of the Bale Bunk 1 assembly for stowage/transport.

In some embodiments, the Bale Bunk 1, 1A is primarily comprised of a framework made from corrosion-resistant material such as stainless steel, powder-coated steel, aluminum alloys, or hardened polymers.

In various typical embodiments, the Bale Bunk 1, 1A is sized to receive a small to large rectangular bale of hay 35. As such, in some versions of the Bale Bunk 1, 1A, the main bed frame 5 and articulated extension 5A (if so equipped) is sized to receive a bale that is about 36 inches in height, 36 inches in width, and 96 inches in length. More specifically, the back-stop frame member 10 is sized to receive a bale that is about 36 inches in height. Of course, in other embodiments, all of the components of the Bale Bunk 1, 1A can be sized to received larger or smaller bales that may be created by various baling methods. In the industry, typical bale sizes can run plus/minus 12 inches to each dimension stated above.

IV. Alternative Embodiments and Other Variations

The various embodiments and variations thereof described herein, including the descriptions in any appended Claims and/or illustrated in the accompanying Figures, are merely exemplary and are not meant to limit the scope of the inventive disclosure. It should be appreciated that numerous variations of the invention have been contemplated as would be obvious to one of ordinary skill in the art with the benefit of this disclosure.

Hence, those ordinarily skilled in the art will have no difficulty devising myriad obvious variations and improvements to the invention, all of which are intended to be encompassed within the scope of the Description, Figures, and Claims herein.

What is claimed is:

1. An improved hay-bale-containment device, comprising:
    a main bed frame, having a proximal end and a distal end, and having a first and second side disposed longitudinally along the main bed frame;
    a back-stop frame member, wherein:
        said back-stop frame member is coupled to the proximal end of said main bed frame, and
        said back-stop frame member is substantially orthogonally oriented with respect to said main bed frame;
    an articulated bed extension on said distal end of said main bed frame that is angled upward with respect to the plane of the main bed frame by a predetermined angle and has a plurality of pairs of support legs
        said articulated bed extension of said main bed frame is coupled to said main bed frame via one or more hinge members to facilitate the adjustment of the angle disposed between the main bed frame and said articulated bed extension, and
        said plurality of pairs of support legs of said articulated bed extension have adjustable lengths via telescopically disposed inner and outer members, which are position-lockable;
    a plurality of side-mounted stanchions disposed on said first and second sides of said main bed frame; and
    a plurality of pairs of support legs disposed on the bottom of said main bed frame such that the main bed frame is progressively elevated from the proximal end to the distal end, wherein:
        the proximal end of said main bed frame that is coupled to said back-stop frame member has either the shortest support legs or no support legs,
        there is at least one pair of support legs disposed between the proximal and distal ends of said main bed frame, and
        there is at least one pair of support legs disposed at the distal end of said main bed frame, within the final 15% of the total length of said main bed frame.

2. The improved hay-bale-containment device of claim 1, wherein said plurality of said support legs are sized and placed such that said main bed frame is tilted slightly upward from its back-stop frame member to the distal end of said main bed frame, said upward tilt being 10 degrees±5 degrees.

3. The improved hay-bale-containment device of claim 1, wherein said predetermined angle of said articulated bed extension is 10 degrees±5 degrees.

4. The improved hay-bale-containment device of claim 1, wherein said back-stop frame member is coupled to the proximal end of said main bed frame via one or more hinge members to facilitate the stowage and transport of said improved hay-bale-containment device.

5. The improved hay-bale-containment device of claim 2, wherein each of said plurality of support legs is rotatably coupled to said main bed frame to facilitate the stowage and transport of said improved hay-bale-containment device.

6. The improved hay-bale-containment device of claim 1, wherein said main bed frame has at least one pair of side-mounted stanchions of said plurality of side-mounted stanchions that extend above the top plane of said main bed frame in order to facilitate stable positioning of any bale of hay upon said main bed frame.

7. The improved hay-bale-containment device of claim 6, wherein each of said at least one pair of stanchions is rotatably mounted on said main bed frame in order to facilitate transport and stowage of said improved hay-bale-containment device.

8. The improved hay-bale-containment device of claim 1, wherein said articulated bed extension has at least one pair of side-mounted stanchions that extend above the top plane of said articulated bed extension.

9. The improved hay-bale-containment device of claim 8, wherein each of said at least one pair of stanchions is rotatably mounted on said articulated bed extension in order to facilitate transport and stowage of said improved hay-bale-containment device.

10. The improved hay-bale-containment device of claim 1, wherein the main frame, back-stop frame member, and articulated bed extension of said improved hay-bale-containment device are substantially fabricated from one or more of the group of corrosion-resistant materials consisting of stainless steel, powder-coated steel, aluminum alloys, and hardened polymers.

11. The improved hay-bale-containment device of claim 1, wherein the main frame, back-stop frame member, and articulated bed extension of said improved hay-bale-containment device are sized to receive and contain a bale with the dimensions of 36 inches±12 inches in height, 36 inches±12 inches in width, and 96 inches±12 inches in length.

12. A method of using an improved hay-bale-containment device according to claim 1, comprising the steps of:
    obtaining an improved hay-bale-containment device, comprising:
        a main bed frame, having a proximal end and a distal end, and having a first and second side disposed longitudinally along the main bed frame;
        a back-stop frame member, wherein: said back-stop frame member is coupled to the proximal end of said main bed frame, and
            said back-stop frame member is substantially orthogonally oriented with respect to said main bed frame;
        an articulated bed extension on said distal end of said main bed frame that is angled upward with respect to the plane of the main bed frame by a predetermined angle and has a plurality of pairs of support legs, wherein:
            said articulated bed extension of said main bed frame is coupled to said main bed frame via one or more hinge members to facilitate the adjustment of the angle disposed between the main bed frame and said articulated bed extension, and
            said plurality of pairs of support legs for said articulated bed extension have adjustable lengths via telescopically disposed inner and outer members, which are position-lockable;
        a plurality of side-mounted stanchions disposed on said first and second sides of said main bed frame; and a plurality of pairs of support legs disposed on the bottom of said main bed frame such that the main bed frame is progressively elevated from the proximal end to the distal end, wherein:
  the proximal end of said main bed frame that is coupled to said back-stop frame member has either the shortest support legs or no support legs,
  there is at least one pair of support legs disposed between the proximal and distal ends of said main bed frame, and
  there is at least one pair of support legs disposed at the distal end of said main bed frame, within the final 15% of the total length of said main bed frame;
placing a bale of hay, alfalfa, or other grasses onto the main bed frame of said improved hay-bale-containment device, with one end of the bale buttressed against the back-stop frame member of said improved hay-bale-containment device; and
flaking-off parts of said bale, leaving the remainder of said bale buttressed against said back-stop frame member.

13. The method of claim 12, wherein: the method further comprising the step of: adjusting the length of said plurality of pairs of support legs of said articulated bed extension to angle said articulated bed extension upward to ensure that said bale is biased to remain buttressed against said back-stop frame member as parts of said bale are flaked-off.

14. The method of claim 13, wherein: said main bed frame is coupled to said back-stop frame member via one or more hinges, said plurality of pairs of support legs of said articulated bed extension and of said main bed frame are coupled via hinges, and said plurality of side-mounted stanchions are rotatably coupled to said main bed frame via hinges; the method further comprising the step of: preparing said improved hay-bale-containment device for transport and stowage by folding said back-stop frame member and said articulated bed extension at respective said one or more hinges onto said main bed frame; and folding said plurality of side-mounted stanchions and all plurality of pairs of support legs of said improved hay-bale-containment device onto one of said back-stop frame member, said articulated bed extension, and said main bed frame, to reduce the overall size of said improved hay-bale-containment device.

\* \* \* \* \*